US010361908B2

United States Patent
Pasini et al.

(10) Patent No.: US 10,361,908 B2
(45) Date of Patent: Jul. 23, 2019

(54) MANAGEMENT OF OSS USING DCN CAPABILITY

(71) Applicant: Telefonaktiebolaget LM Ericsson (publ), Stockholm (SE)

(72) Inventors: Federico Pasini, Genoa (IT); Xiaolei Fan, Beijing (CN); Jie Gao, Beijing (CN); Giovanni Giurin, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 16 days.

(21) Appl. No.: 15/737,584

(22) PCT Filed: Jul. 10, 2015

(86) PCT No.: PCT/CN2015/083712
§ 371 (c)(1),
(2) Date: Dec. 18, 2017

(87) PCT Pub. No.: WO2017/008185
PCT Pub. Date: Jan. 19, 2017

(65) Prior Publication Data
US 2018/0191558 A1    Jul. 5, 2018

(51) Int. Cl.
*H04L 12/24* (2006.01)
*H04L 12/26* (2006.01)
*H04L 29/14* (2006.01)

(52) U.S. Cl.
CPC .......... *H04L 41/0695* (2013.01); *H04L 41/00* (2013.01); *H04L 41/0604* (2013.01);
(Continued)

(58) Field of Classification Search
CPC . H04L 41/0695; H04L 41/00; H04L 43/0823; H04L 43/08; H04L 41/0604; H04L 41/147; H04L 69/40; H04L 41/12
See application file for complete search history.

(56) References Cited

U.S. PATENT DOCUMENTS 6,446,123 B1 * 9/2002 Ballantine .............. H04L 41/06
709/223
6,963,542 B2 * 11/2005 Manthoulis ........... H04L 41/022
370/252
(Continued)

FOREIGN PATENT DOCUMENTS

WO    2013131585 A1    9/2013
WO    2015028056 A1    3/2015

OTHER PUBLICATIONS

Telecommunication Standardization Sector of ITU, "Architecture and specification of data commmunication network", Series G: Transmission Systems and Media, Digital Systems and Networks Data over Transport—Generic aspects—Transport network control aspects Series Y: Global Information Infrastructure, Internet Protocol Aspects and Next-Generation Networks Internet protocol aspects—Operation, administration and maintenance, Sep. 2010, pp. 1-96, G.7712/Y.1703.
(Continued)

*Primary Examiner* — Afshawn M Towfighi
(74) *Attorney, Agent, or Firm* — Patent Portfolio Builders, PLLC

(57) ABSTRACT

An operational support system (OSS) (96) for a telecommunications network, is coupled by a data communications network (DCN) (410, 510) with network elements (110) managed by the OSS. The OSS is managed by monitoring (200) an actual capability of the data communications network, and performance of an OSS operation is predicted (220) based on reference performance information and on the actual capability of the DCN. An alarm is raised based on a comparison (230) between the predicted performance and a defined threshold associated with the operation of the operational support system. Compared to known OSS monitoring to detect when an OSS operation has failed to complete, this raising of the alarm can enable pre-emptive
(Continued)

management action. By making the prediction based on actual DCN capability, the prediction can have reduced errors from variability or unpredictability in DCN capability.

19 Claims, 12 Drawing Sheets

(52) U.S. Cl.
CPC ............ *H04L 41/147* (2013.01); *H04L 43/08* (2013.01); *H04L 43/0823* (2013.01); *H04L 41/12* (2013.01); *H04L 69/40* (2013.01)

(56) References Cited

U.S. PATENT DOCUMENTS 8,705,359 B2* 4/2014 Bou-Abboud ......... G06Q 30/02
370/229

2005/0018611 A1* 1/2005 Chan ..................... H04L 41/147
370/241
2012/0023205 A1 1/2012 Hu et al.
2013/0316722 A1* 11/2013 Bader ................... H04W 88/18
455/453

OTHER PUBLICATIONS

Telecommunication Standardization Sector of ITU, "Principles for a telecommunications management network", Series M: TMN and Network Maintenance: International Transmission Systems, Telephone Circuits, Telegraphy, Facsimile and Leased Circuits Telecommunications management network, Feb. 2000, pp. 1-44, M.3010.
Telecommunication Standardization Sector of ITU, "Lower layer protocol profiles for the Q and X interfaces", Series Q: Switching and Signalling Q3 interface, Feb. 2004, pp. 1-46, Q.811.

\* cited by examiner

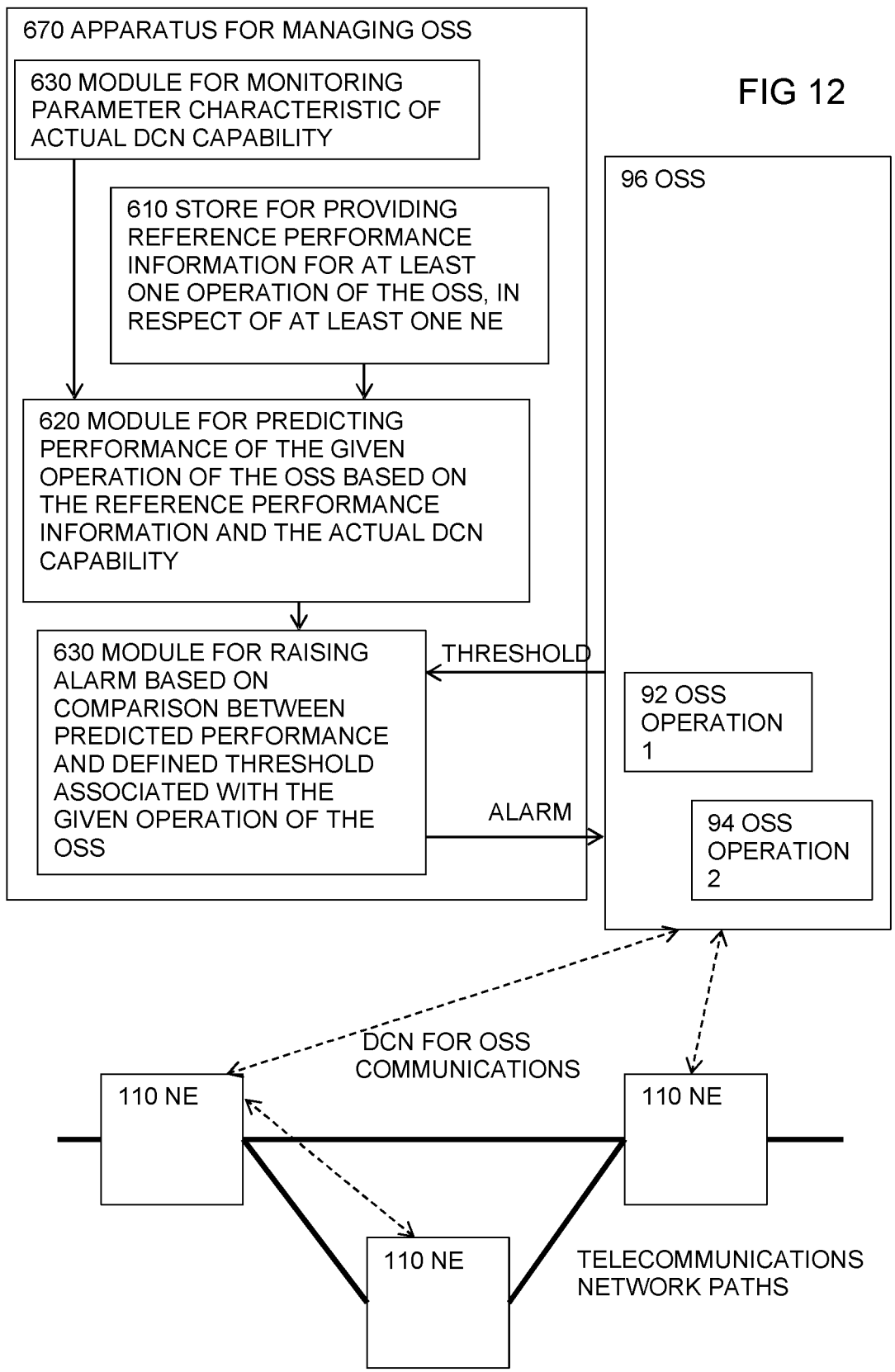

MANAGEMENT OF OSS USING DCN CAPABILITY

TECHNICAL FIELD

The present invention relates to methods of managing an operational support system for a telecommunications network, and to corresponding apparatus, and corresponding computer programs.

BACKGROUND

It is known to provide an Operational Support System (OSS) for managing a telecommunications network made up of network elements such as routers, gateways, optical terminals, nodes or components of nodes and so on. The OSS is sometimes called, or has a component called a network management system (NMS) and typically undertakes any or all of the management functions known as FCAPS, that is, fault management, configuration management, accounting management, performance management, and security management. These management functions can each encompass a variety of operations. The operations (sometimes called OSS applications) may be carried out with respect to an individual network element, or involve a group of network elements, or involve a service making use of many network elements level as appropriate. The OSS typically has a remote part hosted on one or more servers at some central location, and can have local or distributed parts such as agent software hosted at network elements. The centralized part of the OSS typically needs to communicate with the network elements to carry out its operations. A Data Communications Network (DCN) is provided for this, logically distinct from the telecommunications network being managed by the OSS, but in physical terms the DCN may be partly separate (also called an "access" part of the DCN, or out-of-band) and partly using resources of the telecommunications network (in band).

The DCN typically consists of computers, routers/switches and managed equipments, all of these in a typical example may be compliant with ITU-T Q.811. The DCN enables network element management from OSS applications, and a healthy DCN allows the applications to run at the best performance and to respond nearly real time to the given task. The NEs can be interconnected to the DCN via an Ethernet Interface (Gateway NE) in one example, or between them via embedded channels inside the traffic lines (STM-n for SDH or optical channels for DWDM for example). These embedded channels are called, depending from the kind of frame overhead they use, DCCs, OSCs, GCCs, and others.

For protection purpose, several DCC/OSCs/GCCs channels can be activated between nodes flowing same or separated optical links, and the routing algorithm metrics will allow the proper routing path selection. The same considerations may apply when the data plane is based on Ethernet links, where specific VLAN tags are used to carry management data and logically protected DCN topologies are in place.

It is useful to be able to manage the DCN, especially as it becomes more complex. Specific applications are known to auto-discover and monitor the deployed DCN to manage equipments, including out-of-band and in-band communication channels, able to automatically understand, for each discovered node, the type and a set of relevant attributes (such as the nodes having a DCN GNE function and the set of nodes managed through them).

It is also known to monitor the OSS applications by providing health check mechanisms on the hosting platform (e.g. memory/disk usage, SW processes CPU consumption, etc.), to be able to anticipate possible platform related problems before these will impact the OSS applications running on it. Otherwise it is left to the design and configuration of the OSS applications and the DCN to ensure there is enough margin of capability in the DCN so that the OSS applications run sufficiently quickly and reliably.

SUMMARY

Embodiments of the invention provide improved methods and apparatus. According to a first aspect of the invention, there is provided a method of managing an operational support system (OSS) for a telecommunications network, the telecommunications network comprising network elements, the operational support system being coupled by a data communications network with those of the network elements managed by the operational support system, and the method comprising steps of monitoring at least one parameter characteristic of an actual capability of the data communications network, and providing reference performance information for at least one operation of the operational support system in respect of at least one of the network elements. The method has further steps of predicting performance of the operation of the operational support system based on the reference performance information for the operation and on the actual capability of the data communication network, and raising an alarm based on a comparison between the predicted performance and a defined threshold associated with the operation of the operational support system.

Compared to known OSS monitoring to detect when an OSS operation has failed to complete, this raising of the alarm based on the predicted OSS performance can enable pre-emptive management action, either by alerting an operator or triggering automatic action, for example. By making the prediction based on actual DCN capability, the prediction can have reduced errors from variability or unpredictability in DCN capability. This is particularly useful for OSS operations which are vulnerable to DCN capability degradation because they have a heavy communications load, and in relation to larger network elements having more information to be communicated.

Any additional features can be added, and some are described below and set out in dependent claims. One such additional feature is a step of determining the threshold based on a monitored actual performance of the operation of the operational support system. Comparing to the monitored actual OSS performance can enable anomalous degradation to be identified more accurately or more quickly including for example degradation not predicted, caused for example by unintended operation of the OSS operation or by the DCN, or recent changes in DCN capability since the last measurements of actual DCN capability.

Another such additional feature is a subsequent step of using the alarm as an input to at least one of: a step of triggering a warning to an operator, a step of adapting an operation of the OSS, and a step of adapting the DCN. These are various responses to make use of the new prediction information, to pre-empt the risk of failure to complete an OSS application.

Another such additional feature is the reference performance information being dependent on a communication load needed for the operation in relation to the respective network element. This is a notable input for the prediction, reflecting e.g. a number of termination points, and it can be applied with a predetermined weighting. Another such additional feature is the reference performance information being dependent on a protocol type used by the DCN for the respective network element. This is another notable input for the prediction and again can be applied with a predetermined weighting, and others can be conceived. The protocol type can affect the performance in various ways, e.g by how it specifies retransmissions.

Another such additional feature is the step of predicting performance comprising selecting from at least two operations of the OSS relating to different network elements needing different communication loads, according to whichever of the different network elements corresponds more closely to a network element for which the actual performance is monitored, and the predicted performance for the comparison being in respect of the selected one of the operations of the OSS. By predicting for network elements of different sizes, the comparison with the current performance can be made more accurate by selecting a corresponding prediction.

Another such additional feature is the predicting of performance of the operation being based on the monitored actual capability of the data communication network adjusted by a predetermined factor representing a sensitivity of the predicted performance to the actual capability of the data communication network. This can improve accuracy of the prediction.

Another such additional feature is the predicting of the performance comprising predicting a completion time of the operation and the monitored actual performance comprising a monitored actual completion time for the operation. This is a particularly useful aspect of the performance of a feature of the OSS but others can be conceived such as a rate or a success rate and so on.

Another such additional feature is the comparison of the predicted performance and the defined threshold comprising determining if the monitored actual completion time is longer than the predicted completion time by a predetermined amount. This is a useful way of triggering the indication, but others can be conceived.

Another such additional feature is the at least one parameter indicative of the capability of the data communications network comprising at least one of: a latency, a bandwidth and a packet loss characteristic. These are performance measures particularly relevant to OSS performance but others can be conceived.

Another aspect of the invention provides a computer program having instructions configured to, when run on a computer, perform a method as set out in any of the above sets of features for managing an operational support system. Another such additional feature is the computer program when stored on a computer readable material.

Another aspect provides apparatus for managing an operational support system (OSS) for a telecommunications network, the telecommunications network comprising network elements, the operational support system being coupled by a data communications network with those of the network elements managed by the operational support system, and the apparatus comprising a store for storing reference performance information for at least one operation of the operational support system in respect of at least one of the network elements, and a processing circuit and a memory circuit, the memory circuit having instructions executable by the processing circuit. The processing circuit when executing the instructions is configured to monitor at least one parameter characteristic of an actual capability of the data communications network and to predict a performance of the operation of the operational support system based on the reference performance information for the operation and on the actual capability of the data communication network, and to raise an alarm based on a comparison between the predicted performance and a defined threshold associated with the operation of the operational support system.

Another such additional feature is the processing circuit being adapted to determine the threshold based on a monitored actual performance of the operation of the operational support system. Another such additional feature is the processing circuit being adapted to use the alarm for at least one of: triggering a warning to an operator, adapting an operation of the OSS, and adapting the DCN. Another such additional feature is the store being configured to provide the reference performance information dependent on a communication load needed for the operation in relation to the respective network element. Another such additional feature is the store being configured to provide the reference performance information dependent on a protocol type used by the DCN for the respective network element.

Another such additional feature is the processing circuit being adapted to predict the performance by selecting from at least two operations of the operational support system each relating to different network elements needing different communication loads, according to whichever of the different network elements corresponds more closely to a network element for which the actual performance is monitored, and the processing circuit being adapted to perform the comparison based on the predicted performance for the selected one of the operations of the OSS. Another such additional feature is the processing circuit being adapted to predict the performance of the operation based on the monitored actual capability of the data communication network adjusted by a predetermined factor representing a sensitivity of the predicted performance to the actual capability of the data communication network. Another such additional feature is the processing circuit being adapted to predict the performance as a predicted completion time of the operation, and to use an actual completion time as the monitored actual performance for the operation. Another such additional feature is the processing circuit being adapted to make the comparison of the predicted performance and the defined threshold by determining if the monitored actual completion time is longer than the predicted completion time by a predetermined amount.

Another such additional feature is the monitor being adapted to monitor a performance of the data communications network in terms of at least one of: a latency, a bandwidth and a packet loss characteristic. Another aspect provides an operational support system having the apparatus of any of the sets of apparatus features set out above.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

How the present invention may be put into effect will now be described by way of example with reference to the appended drawings, in which:

FIG. 12 shows a schematic view of a modular example according to an embodiment.

DETAILED DESCRIPTION

Figure 1:
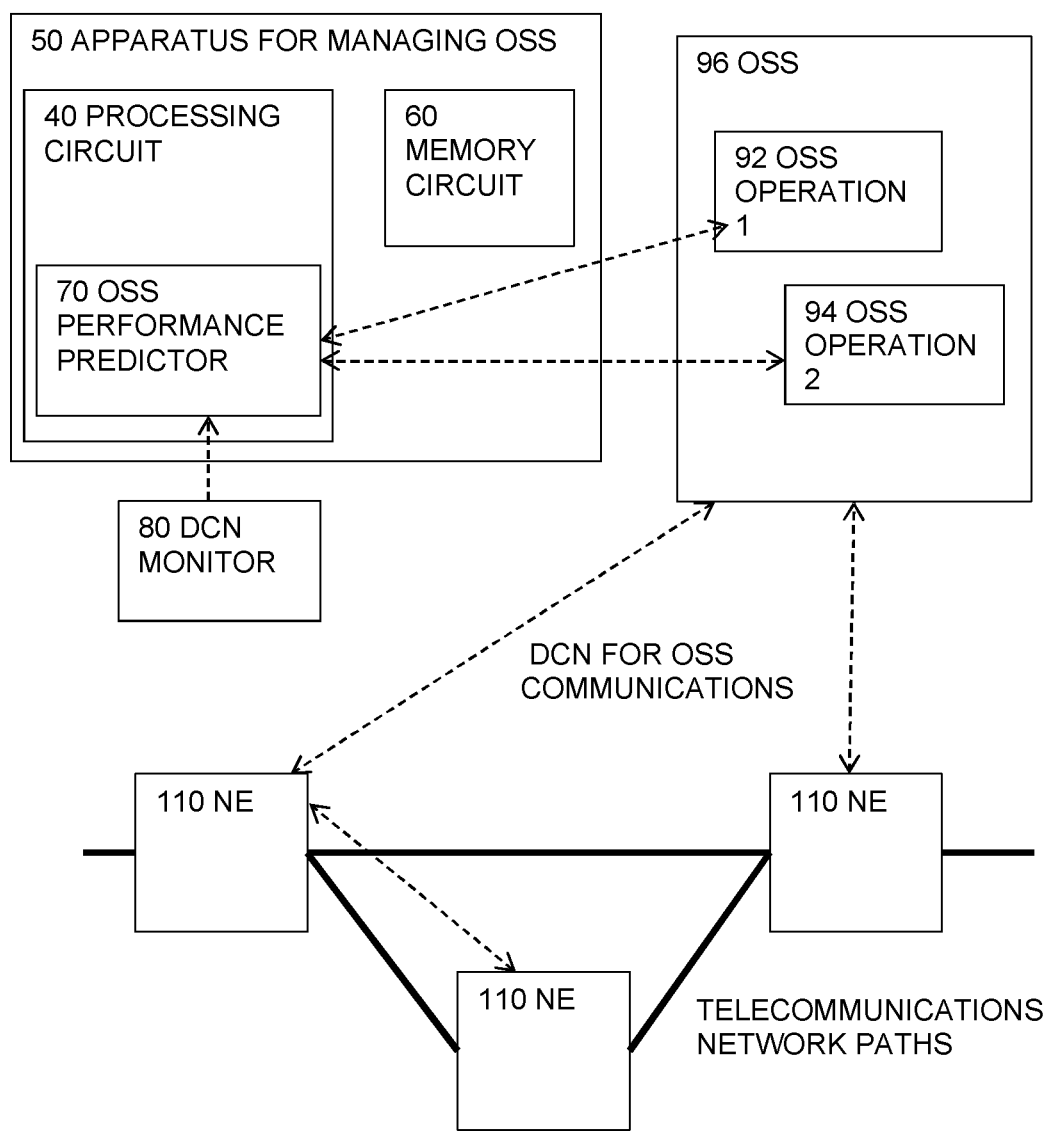
FIG. 1 shows a schematic view of OSS, DCN and NEs.

The present invention will be described with respect to particular embodiments and with reference to certain drawings but the scope of the invention is not limited thereto. The drawings described are only schematic and are non-limiting. In the drawings, the size of some of the elements may be exaggerated and not drawn to scale for illustrative purposes.

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to an OSS are intended to encompass any kind of system for managing a telecommunications network or NEs of the telecommunications network.

References to a DCN are intended to encompass any kind of network for communicating between the OSS and the NEs.

References to performance information are intended to encompass completion time, and other types of performance information such as completion rate, reliability of completion, and derivations and combinations of such information.

References to capability of the DCN are intended to encompass capabilities such as latency or packet loss, or bandwidth, or other similar capabilities which can affect the performance of the OSS.

References to alarm are intended to encompass any representation of an alarm such as a signal or visual indication or a digital representation in a store for example.

ABBREVIATIONS

API Application Programming Interface
CLNP Connection Less Network Protocol
DCC Data Communications Channel
DCN Data Communication Network
FCAPS fault management, configuration management, accounting management, performance management, and security management
GCC General Communications Channel
GNE Gateway Network Element
IS-IS Intermediate System to Intermediate System Routing Protocol
ITU-T International Telecommunications Union-Telecommunications
MCC MPLS-TP Management Communication Channel
MPLS-TP MultiProtocol Label Switching-Transport Profile
NE Network Element
NSAP Network Service Access Point
OSC Optical Supervisory Channel
OSI Open System Interconnection
OSS Operational Support System
OTN Optical Transmission Network
SDH Synchronous Digital Hierarchy
TMN Telecommunication Management Network
WDM Wavelength Division Multiplex Introduction By way of introduction to the embodiments, some issues with conventional designs will be explained. One of the problems that can affect the performances of an OSS application is related to DCN unavailability or degraded DCN service. Some of the effects will be described in relation to an example of a DCN where both access DCN and in band DCN parts are deployed to provide end to end node connectivity to the OSS through GNE routing functions. To connect the OSS to the managed NEs, usually an out of band DCN is deployed as based on dedicated high performance routers interconnected by high-bandwidth links. There may be a set of potential bottlenecks for the communications between OSS and NEs. For example an overload of the GNE routing capacity or an overload of in-band communication channels (DCCs, GCCs, MCCs, VLAN Tag on Ethernet uplinks, etc.) bandwidth availability can occur. In fact, even if the DCNs are usually designed taking in account such node parameters usually measured during specific testing by the vendors or using well known estimates according to the technology in use, in real network life these figures can be progressively (and "silently") overloaded in a temporary or even permanent way by an incorrect application configuration, or by changed application usage profiles for example.

Such DCN overloading typically has the initial side effect of introducing into the end to end communication an extra delay (latency) as well as some packet loss percentage. Such progressive communication degradation can then cause serious application disruptions, such as failures of operations of FCAPS features which are DCN intensive. For example a software download to an NE, scheduled node back-ups, or node configurations or even a Control Plane protection activation, can fail to complete. Only at an advanced or final degradation stage of the DCN are the managed NEs then reported by the OSS application as not being managed anymore (e.g. through an OSS node link down event).

Accordingly, a problem for an OSS application when running on a real network is how to react to changes/degradation in DCN capability. The OSS application is typically keeping the NE status updated through a keep alive mechanism, but it does not know what is the real time status of the connectivity in terms of available bandwidth (bw), delay, or if there is any packet loss percentage.

Thus, even if the OSS application perceives the managed NE as connected, when it starts some bw intensive or latency/pkt loss sensitive feature (e.g. sw download, performance collection, node configuration realignment, etc.) the feature does not successfully complete.

This is due to the fact that OSS applications do not provide specific instruments to allow a DCN network wide auto diagnosis to prevent the OSS application from starting or to adapt the OSS application when the DCN capability has degraded. For example, in case of a DCN overloading due to an incorrect application configuration or due to some node/link performance degradation (e.g. overload of some sw node resources, node hw malfunctions, etc.) the current OSS applications have no way of predicting future application impacts before they really happen (e.g. causing some OSS feature activation failures). Such DCN performance degradation can have temporary or permanent causes. These causes can sometimes be administrative in nature, such as the case that some NEs or links are temporarily unavailable due to maintenance activities, or in the case of DCN topology changes being introduced. If the OSS application were able to anticipate/predict them via DCN capability monitoring in real time, these side effects on the application could be avoided or at least limited.

Introduction to Some Features of Embodiments

Providing the OSS with a capability to anticipate potential problems from DCN capability degradation before they can affect either the node FCAPS or Control Plane functionalities is a key feature to assure best network performance. Thus a feature of some embodiments is a making predictions for possible OSS faulty conditions based on DCN capability monitoring. Another feature is the ability to raise an alarm when the OSS is operating under DCN degraded conditions, before the DCN degradation can heavily affect any OSS DCN intensive operations of the OSS.

In some embodiments the already available DCN Analyzer application, assuring that the DCN topology is under control, is combined with a new Predictor component. This Predictor component will be able to predict, based on current actual measurement for DCN IP latency and packet loss, if the current measurements are compatible with expected performance of an OSS operation, or if the DCN degradation will impact the OSS operation functionalities.

The Predictor can exploit a prediction model generated by the set of measures available from DCN benchmarking activities carried out off line to provide typical predicted OSS operation response times in case of a set of normalized nodes, with a variety of different DCN latency and pkt loss figures.

Having such a model able to provide expected OSS performances under a certain DCN latency and pkt loss scenario, the Predictor can measure the actual DCN latency and pkt loss figures on field, and measure the actual OSS application response time on field. The alarm can be made dependent on a comparison of the predicted response time calculated in the modeled configuration, with a threshold such as one based on the measured response time.

In the case that the measured value differs significantly from the modeled one, the OSS system can raise an alarm to the operator or take some automatic action. The operator may decide to proceed with a more detailed and accurate DCN analysis to understand and identify the DCN degradation root cause. The combination of the 2 tools DCN Analyzer and Predictor can help address the DCN degradation problems caused by for example:

DCN topology changes due to faults happening in the DCN network reducing the real DCN throughput;

DCN overload due to unforeseen DCN traffic bursty condition, e.g. due to a OSS application mis-configuration etc.; and DCN underperforming due to sw/hw problems in one or more nodes (both in in-band or access DCN part) acting as DCN routers and involved in the routing path between OSS and nodes.

In the first of these three cases, the Predictor can raise an alarm on current DCN capability, and the DCN Analyzer can be used to help the OSS Operator to identify and localize the problem.

In the second and third cases, the Predictor component can discover the problem and raise an alarm to the OSS Operator. Various actions can follow from the alarm, such as restricting starting of any new DCN intensive operations, and/or the DCN Analyzer can then help the operator to investigate the DCN. This might exclude as possible cause a DCN topology change, suggesting then different investigation areas.

FIG. 1, Schematic View of OSS, DCN and NEs According to an Embodiment

FIG. 1 shows a schematic view of an OSS 96 and apparatus 50 for managing the OSS, implemented as a processing circuit 40 for executing software stored on a memory circuit 60 to carry out its functions. In this case the OSS includes an OSS operation 1, labelled 92, and an OSS operation 2, labelled 94, and there may be many more not shown. A DCN monitor 80 is provided for monitoring an actual capability of the DCN. An OSS performance predictor 70 is provided for raising alarms based on the prediction, itself dependent on the monitored actual capability of the DCN. The DCN is shown by dotted lines extending between the OSS 96 and several NEs 110 linked by network paths to form a telecommunications network being managed by the OSS. In some cases the NEs are coupled indirectly to the OSS via other NEs as shown.

Although shown as external to the OSS, in principle the OSS performance predictor can be internal or external to the OSS and still raise alarms. The processing circuit when configured to run the OSS performance predictor, is an example of apparatus for managing the OSS according to an embodiment having a processing circuit and memory. The processing circuit and a memory circuit have instructions executable by the processing circuit, wherein said processing circuit when executing the instructions is configured to monitor at least one parameter characteristic of an actual capability of the data communications network. The OSS performance predictor is also configured to provide reference performance information from a store, for at least one operation of the operational support system in respect of at least one of the network elements. It is also configured to predict a performance of the operation of the OSS based on the reference performance information for the operation and on the actual capability of the DCN and to raise an alarm based on a comparison between the predicted performance and a defined threshold associated with the operation of the operational support system.

The OSS performance predictor is shown coupled to the OSS operation 1 and OSS operation 2, so that it can measure the actual completion times of these operations, or otherwise produce a threshold associated with the operations for use in raising the alarm based on the comparison. The operation of the OSS performance predictor is shown in more detail in FIG. 2 and other figures described below.

Figure 2:
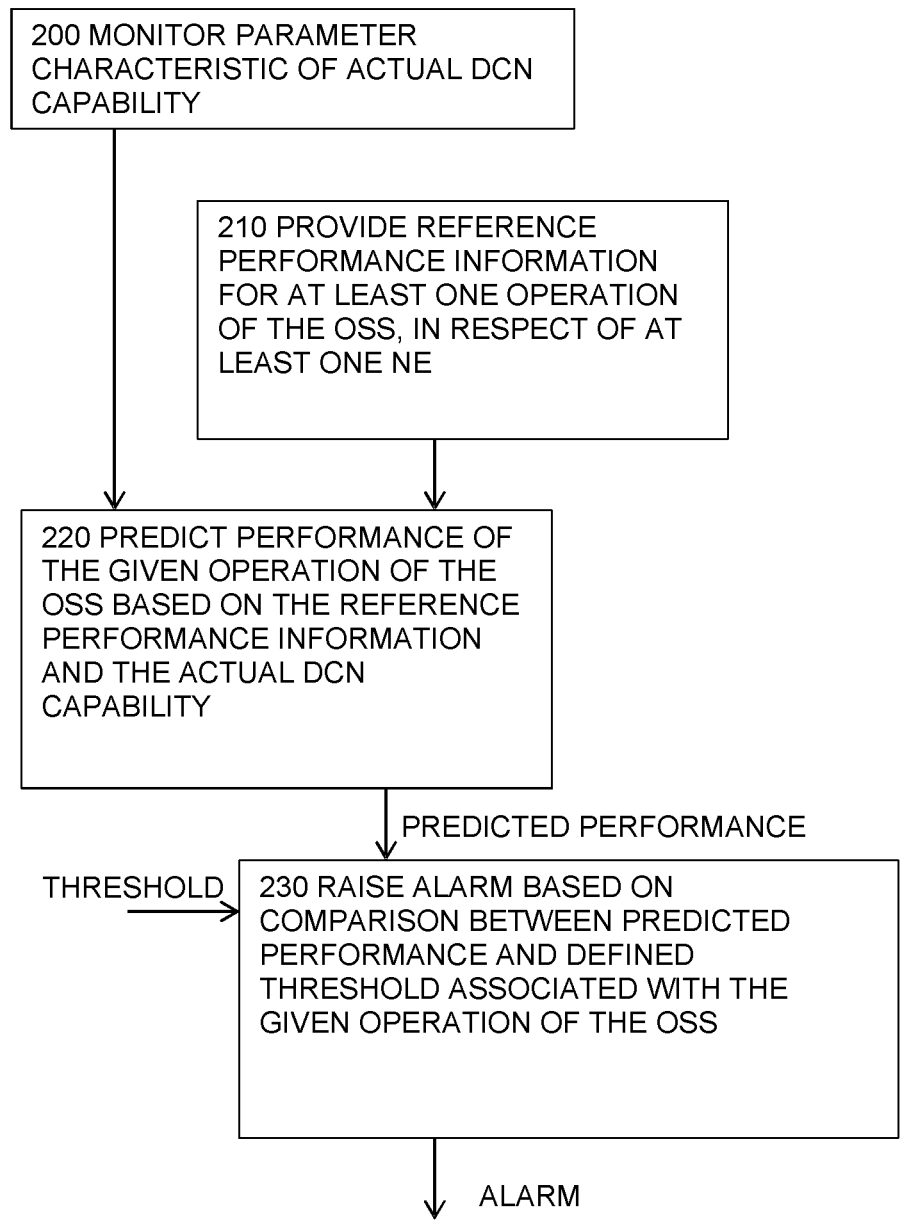
FIG. 2 shows steps in predicting performance and raising an alarm according to an embodiment

FIG. 2, Steps in Predicting Performance and Raising the Alarm According to an Embodiment FIG. 2 shows steps in predicting performance and raising an alarm according to an embodiment, which can be implemented using the apparatus of the embodiment of FIG. 1 or other apparatus. At step 200 a parameter characteristic of actual DCN capability is measured. This can encompass any parameter or parameters which are suitable for representing the DCN capability relevant to predicting OSS performance, and some examples are described below. At step 210, reference performance information for at least one operation of the OSS in respect of at least one NE is provided. This can be provided in any way, for example from memory or by calculation from other predetermined information, and can encompass any kind of reference performance information relevant to predicting OSS performance. Again some examples are set out below. Steps 200 and 210 can be done in parallel or in sequence, and both outputs are used in step 220, which involves predicting performance of the given operation of the OSS based on the reference performance information and on the actual DCN capability. This is notable for making the prediction more accurate. Then at step 230 the predicted performance of the OSS operation is used to raise the alarm, based on a comparison between the predicted performance and a defined threshold associated with the given OSS operation. This threshold can be based on a measured actual performance of the OSS operation or on some predetermined threshold for that operation for example.

Compared to known OSS monitoring to detect when an OSS operation has failed to complete, this raising of the alarm based on the predicted OSS performance can enable pre-emptive management action, either by alerting an operator or triggering automatic action, for example. By making the prediction based on actual DCN capability, the prediction can have reduced errors from variability or unpredictability in DCN capability. This is particularly useful for OSS operations which are vulnerable to DCN capability degradation because they have a heavy communications load, and in relation to larger network elements having more information to be communicated.

Figure 3:
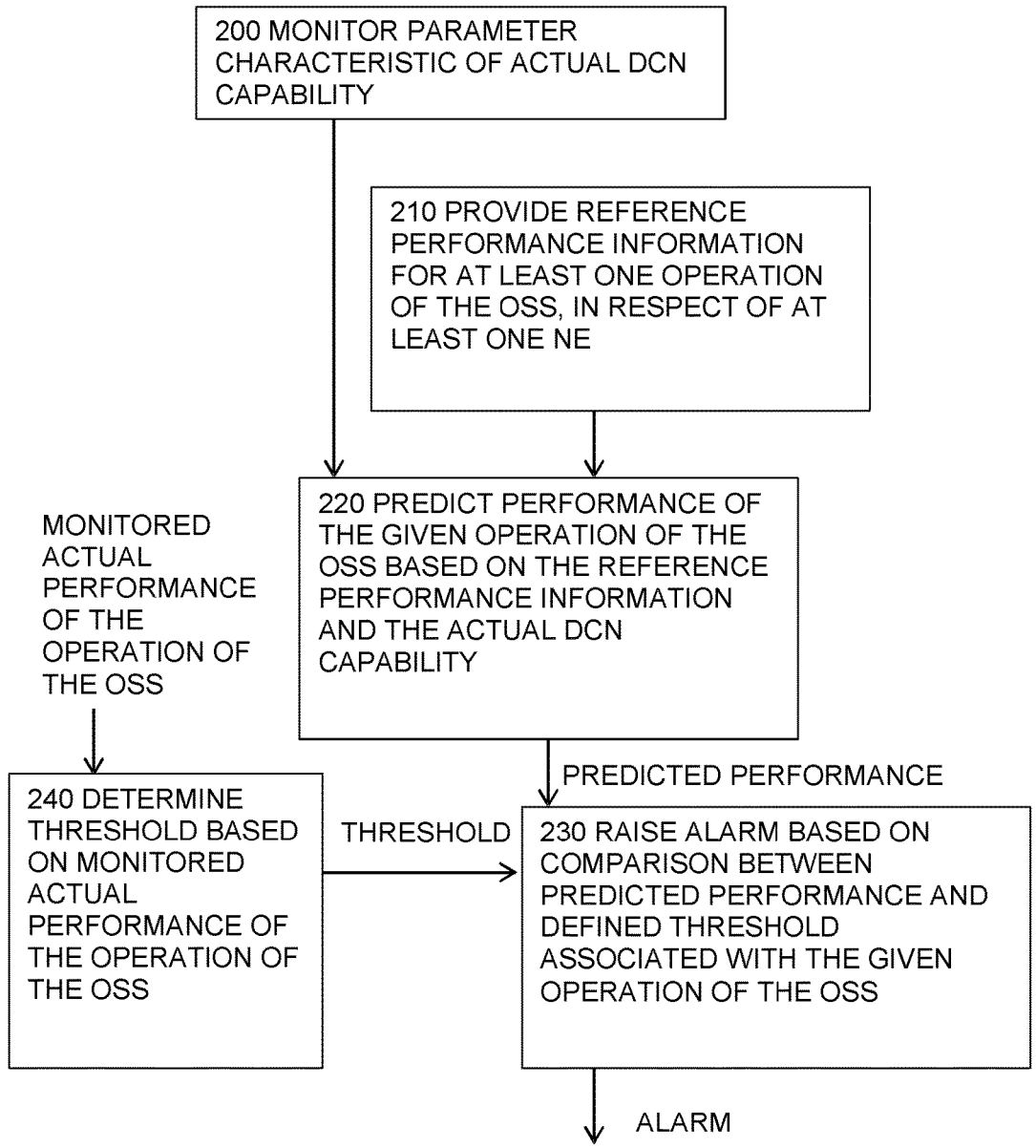
FIG. 3 shows steps according to embodiment also using actual performance of OSS operation.

FIG. 3, Steps According to Embodiment Also Using Actual Performance of OSS Operation FIG. 3 shows steps according to an embodiment similar to that of FIG. 2 and corresponding reference numerals are used as appropriate. In addition there is a step 240 of generating the threshold based on monitored actual performance of the OSS operation. This threshold is then used in the comparison in step 230. Comparing to a threshold based on the monitored actual OSS performance can enable anomalous degradation to be identified more accurately or more quickly including for example degradation not predicted, caused for example by unintended operation of the OSS operation or by the DCN, or recent changes in DCN capability since the last measurements of actual DCN capability.

Figure 4:
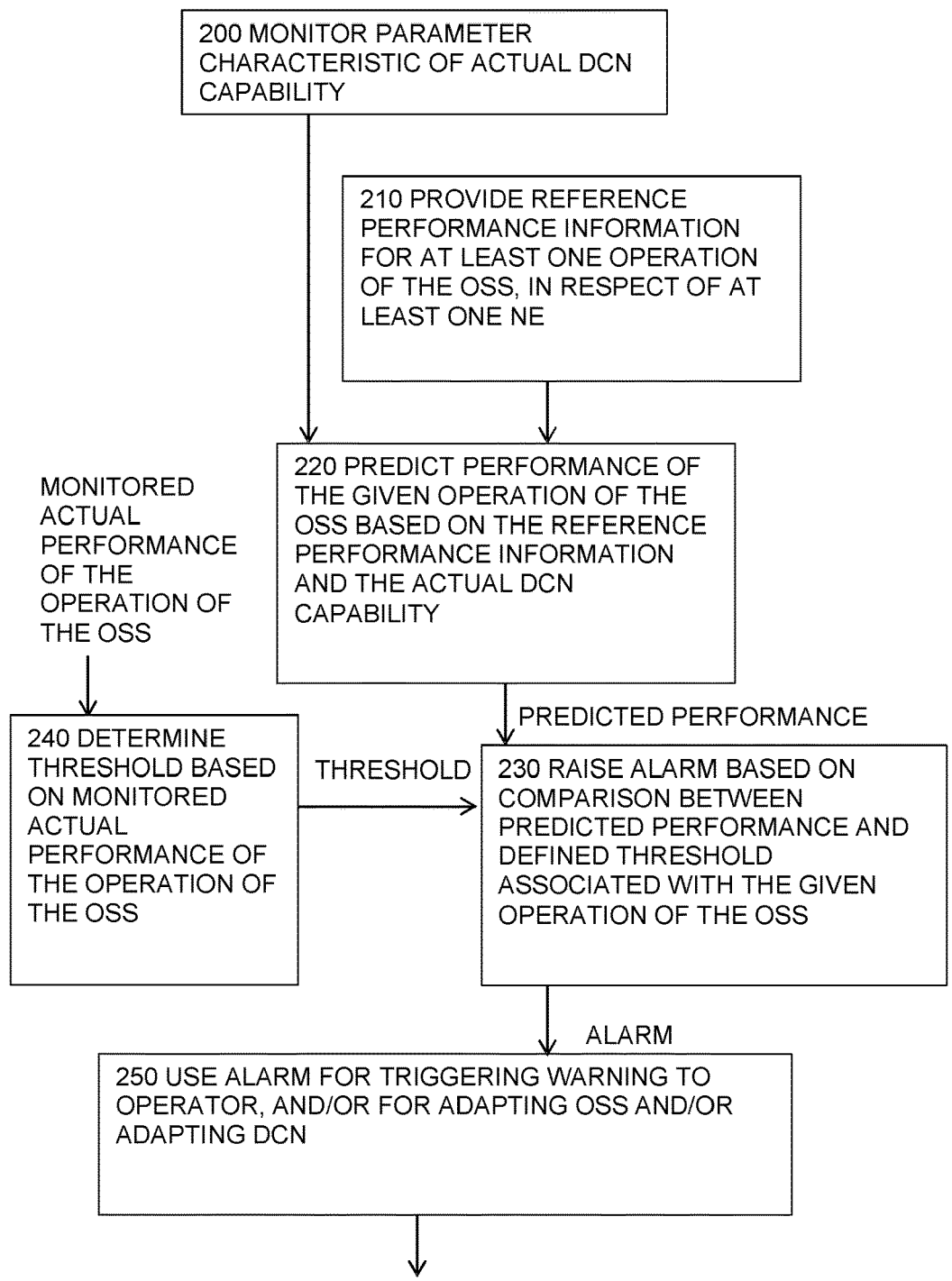
FIG. 4 shows steps according to embodiment also using the alarm for further action.

FIG. 4, Steps According to Embodiment Also Using the Alarm for Further Action

FIG. 4 shows steps according to an embodiment similar to that of FIG. 3 and corresponding reference numerals are used as appropriate. In addition there is a subsequent step 250 of using the alarm as an input to at least one of: a step of triggering a warning to an operator, a step of adapting an operation of the OSS, and a step of adapting the DCN. These are various responses to make use of the new prediction information, to pre-empt the risk of failure to complete an OSS operation.

Figure 5:
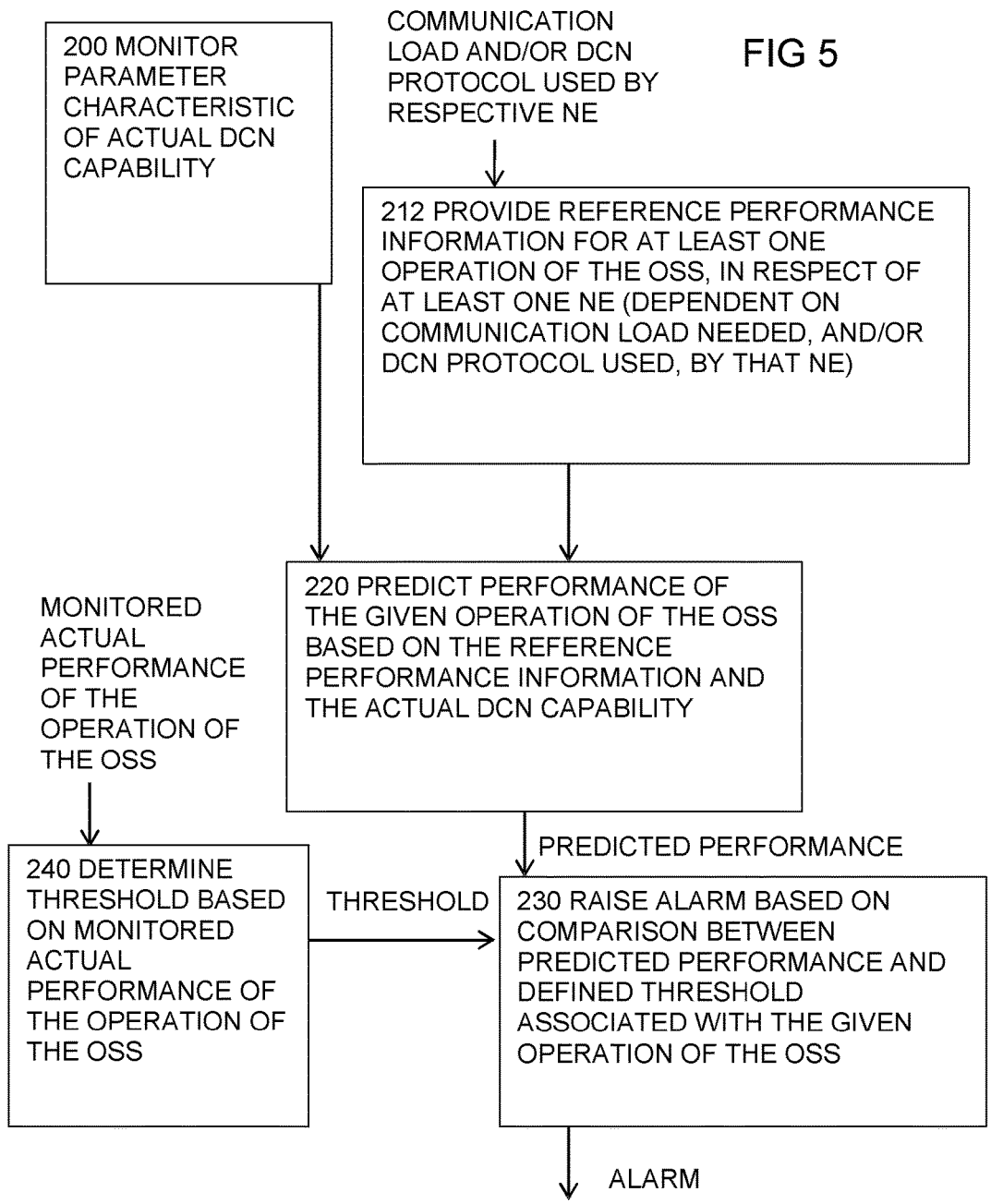
FIG. 5 shows steps according to embodiment in which the reference performance information is dependent on communication load and/or DCN protocol type.

FIG. 5, Steps According to Embodiment in which the Reference Performance Information is Dependent on Communication Load and/or DCN Protocol Type FIG. 5 shows steps according to an embodiment similar to that of FIG. 3 and corresponding reference numerals are used as appropriate. In this case step 210 is replaced by step 212 in which the reference performance information is provided dependent on a communication load needed for the operation in relation to the respective NE, and/or a protocol type used by the DCN for the respective NE.

These are notable inputs for the prediction, the communication load reflecting e.g. a number of termination points, or other aspects related to the NE, and it can be applied with a predetermined weighting. The protocol type is another notable input for the prediction and again can be applied with a predetermined weighting, and others can be conceived. The protocol type can affect the performance in various ways, e.g by how it specifies retransmissions can have an effect on completion time.

Figure 6:
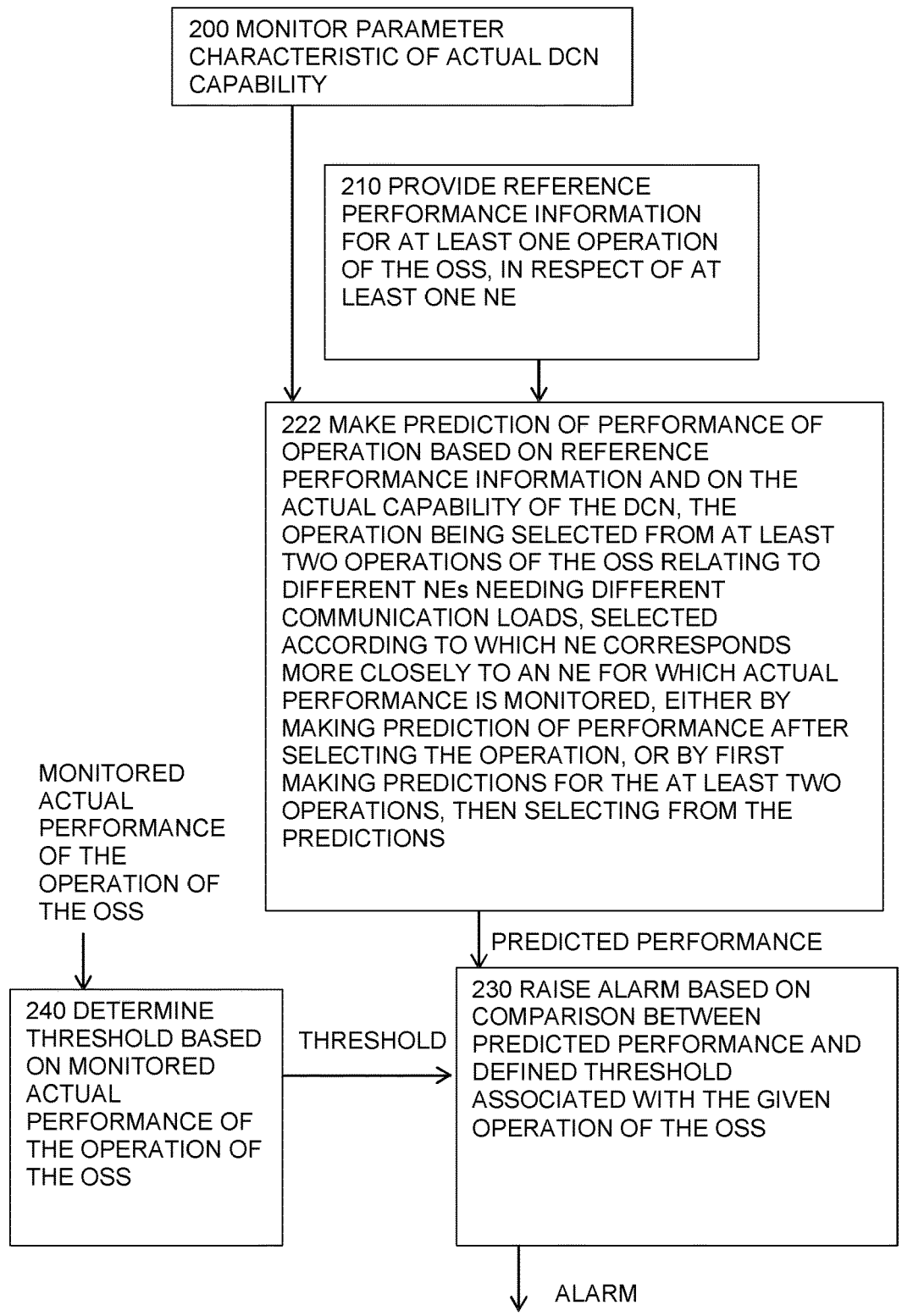
FIG. 6 shows steps according to embodiment in which at least two predictions are made.

FIG. 6, Steps According to Embodiment in which at Least Two Predictions are Made FIG. 6 shows steps according to an embodiment similar to that of FIG. 3 and corresponding reference numerals are used as appropriate. In this case step 220 is replaced by step 222 in which predicting performance of the operation is not only based on reference performance information and based on actual monitored capability of the DCN, but is also made in respect of an operation selected from at least two operations of the OSS relating to different network elements needing different communication loads. The selection is made according to which NE corresponds more closely to an NE for which the actual performance is monitored. In other words this shows an example of the predicting of performance comprising selecting from at least two operations of the operational support system relating to different network elements needing different communication loads, according to whichever of the different network elements corresponds more closely to a network element for which the actual performance is monitored. The predicted performance used for the comparison is therefore the predicted performance of the selected one of the operations of the operational support system. This selectivity can be made either by making the prediction after selecting the operation, or by first making the predictions for the at least two operations and then selecting from the predictions. By making the predicted performance selective to correspond more closely with the NE for which the actual performance is monitored, the comparison with the monitored actual performance can be made more accurate. Therefore the alarm is likely to be a more reliable indicator of DCN capability degradation.

Figure 7:
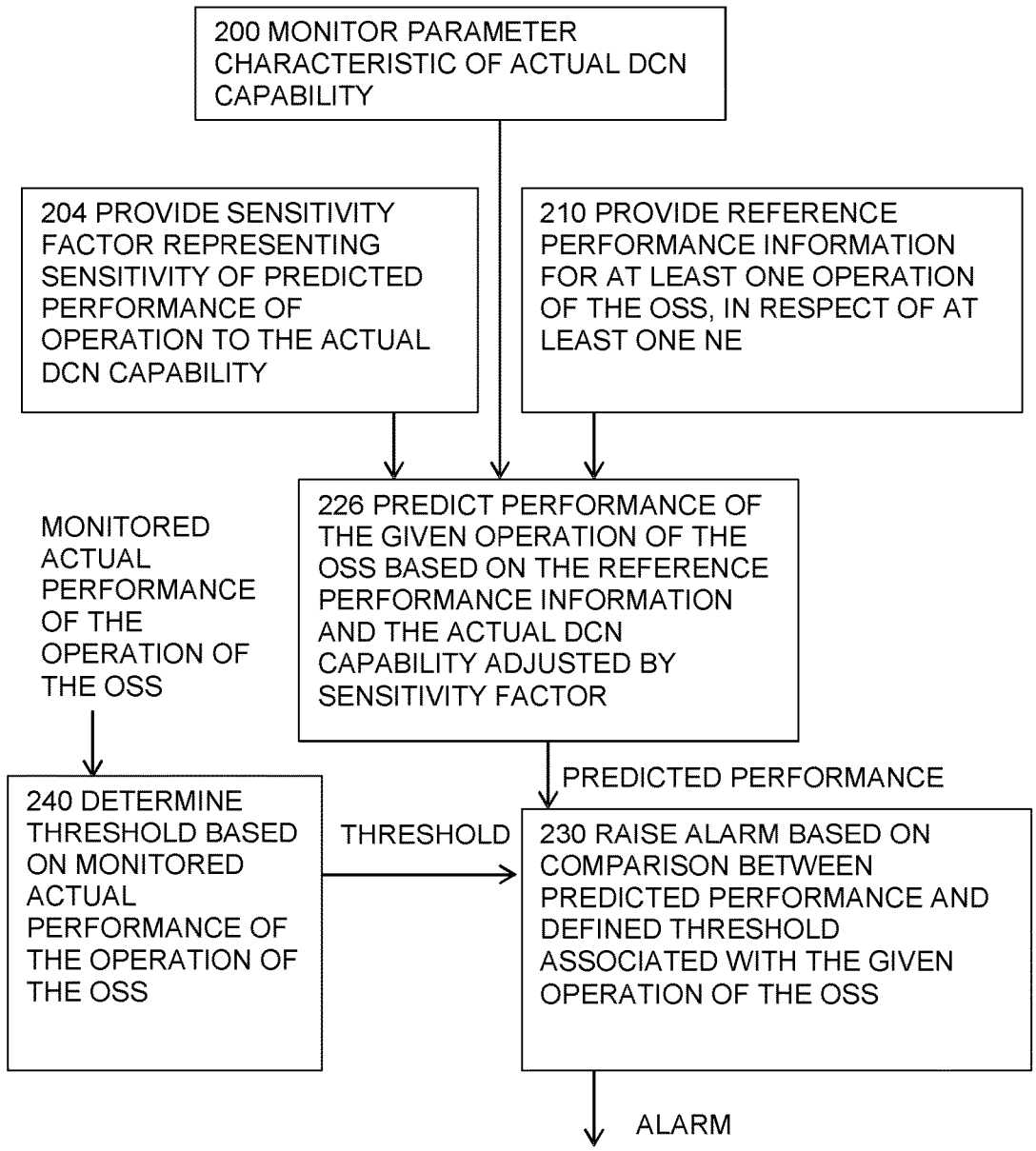
FIG. 7 shows steps according to embodiment in which the prediction is also dependent on a sensitivity factor.

FIG. 7, Steps According to Embodiment in which the Prediction is Also Dependent on a Sensitivity Factor FIG. 7 shows steps according to an embodiment similar to that of FIG. 3 and corresponding reference numerals are used as appropriate. In this case step 220 is replaced by step 226. This shows that the predicting of performance of the operation is now based on the monitored actual capability of the data communication network adjusted by a predetermined factor representing a sensitivity of the predicted performance to the actual capability of the data communication network. Step 204 is shown providing the sensitivity factor to step 226. This can improve accuracy of the prediction. This sensitivity factor can be established by a preliminary off line testing process for example.

Figure 8:
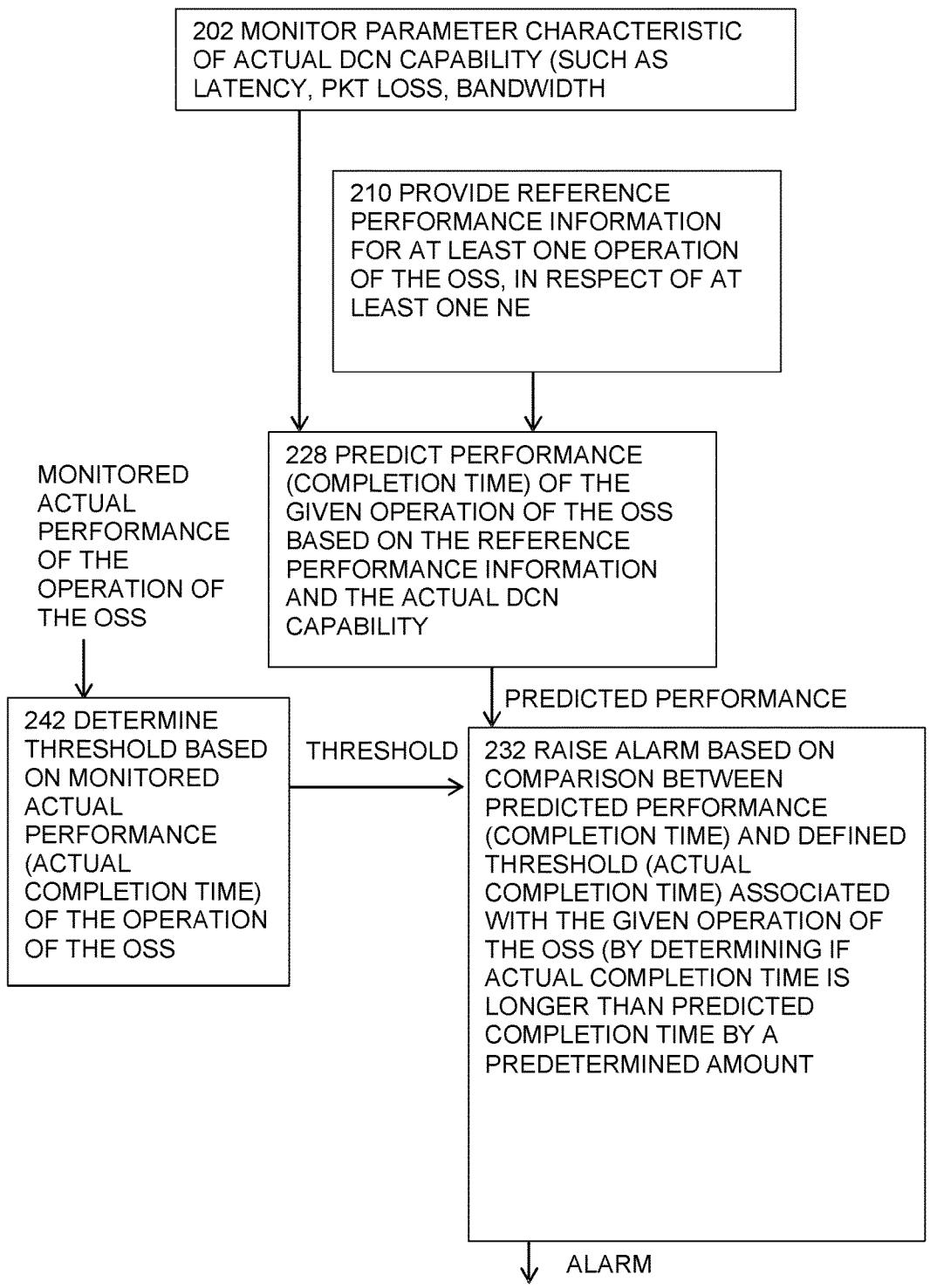
FIG. 8 shows steps according to embodiment predicting completion time and using particular parameters of DCN capability.

FIG. 8, Steps According to Embodiment Predicting Completion Time and Using Particular Parameters of DCN Capability FIG. 8 shows steps according to an embodiment similar to that of FIG. 3 and corresponding reference numerals are used as appropriate. In this case step 200 is replaced by step 202 in which the at least one parameter indicative of the capability of the data communications network can be a latency, and/or a bandwidth and/or a packet loss characteristic such as a packet loss rate in percentage terms. These are capability measures particularly relevant to OSS performance but others can be conceived.

Also, step 220 is replaced by step 228, in which the predicting of the performance comprises predicting a completion time and the monitored actual performance comprises a monitored actual completion time for the operation. This use of completion time is a particularly useful aspect of the performance of a feature of the OSS but others can be conceived such as a rate or a success rate and so on. This use of completion time is not dependent on what parameter is used to indicate DCN capability.

Also step 230 is replaced by step 232 in which the comparison of the predicted performance and the defined threshold comprises determining if the monitored actual completion time is longer than the predicted completion time by a predetermined amount. This is a useful way of triggering the alarm, but others can be conceived. Again this is not dependent on what parameter is used to indicate DCN capability.

Summarizing some of the features discussed above, in some embodiments the prediction and raising of an alarm can be based on the following features:

- Periodically measure the IP DCN latency, e.g. via an average of set of measurements toward the nodes (all or a subset). This can be done by a Predictor component, and can make use of knowledge of the topology of the DCN (e.g. provided by a known DCN analyzer).
- Periodically measure the IP DCN pkt loss percentage, e.g. via an average of set of measurements toward the nodes (all or a subset). This can be done by the Predictor component.
- Periodically measure the OSS application response time, calculating the completion times for a set of OSS features acting as reference (e.g. sw download, node configuration realignment, etc.) toward the nodes (all or a subset).
- Periodically predict OSS application response time, calculating the completion time for same set OSS features/nodes based on the measured DCN latency/pkt loss percentage.
- Compare measured and predicted OSS application response times, and raise an alarm (e.g. "Potential DCN degradation alarm") if these results differ significantly (e.g. by a factor of more than two times or three times for example).

Figure 9:
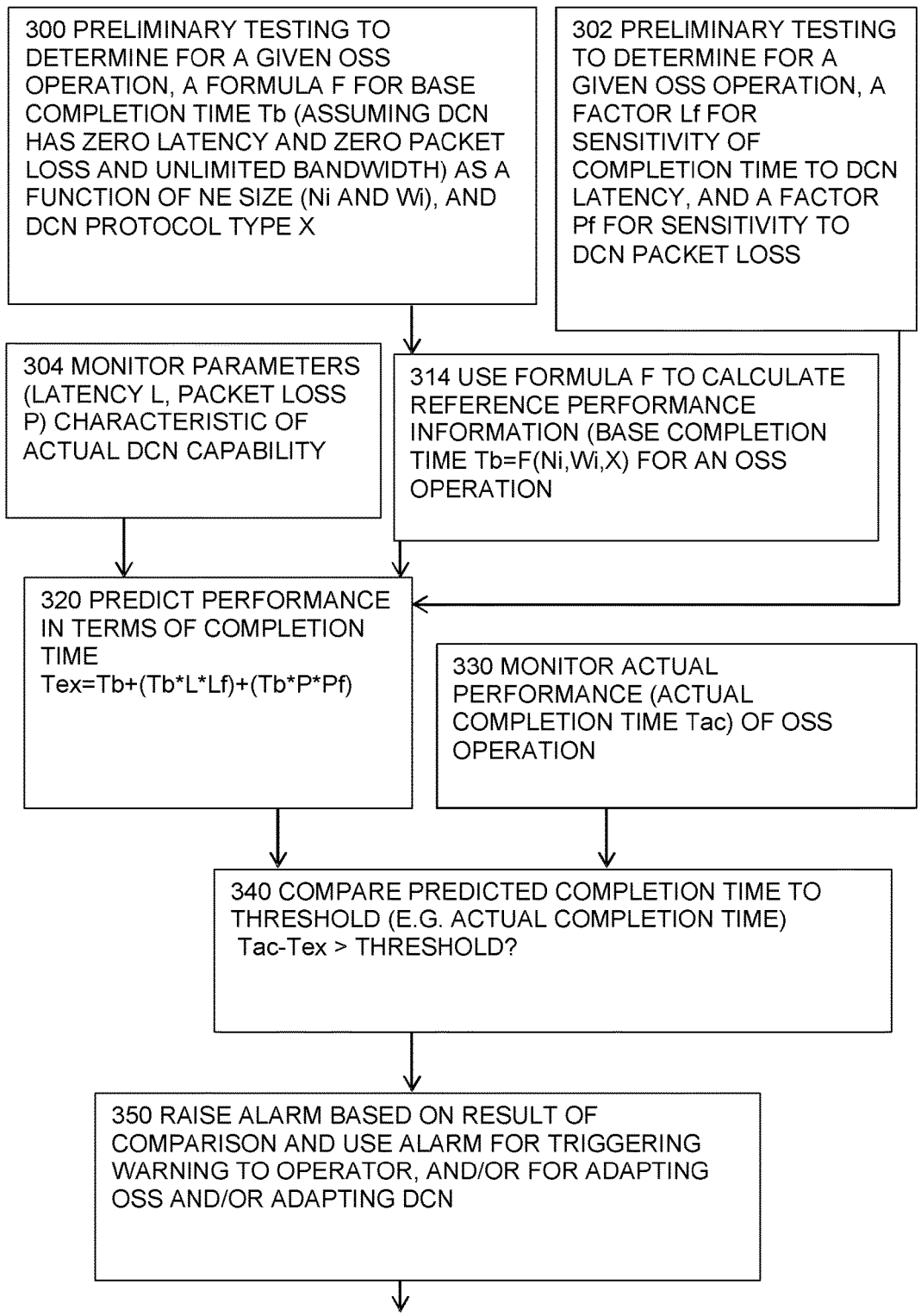
FIG. 9 shows steps according to embodiment with more details of prediction algorithm.

FIG. 9, Steps According to Embodiment with More Details of Prediction Algorithm

FIG. 9 shows steps according to an embodiment with more details of an example algorithm for the prediction model. This embodiment shows some of the features of other embodiments described above and can be combined with any of them. Usually the network elements have on board many objects that have to be checked and managed remotely by management software (traffic ports, termination points, connections, services, alarms, etc.). To allow the management of these resources, each network element can have controller unit software that implements a protocol stack to communicate via DCN with a remote manager (OSS).

Usually a different kind of communication protocol is used for different types of NE. Also there are likely to be different volumes of data traffic flowing across the DCN according to the NE type and NE size. If an ideal DCN network without unwanted constraints (e.g. latency, packet loss, bandwidth limits etc.) is considered, the completion time of an OSS management operation on can be assumed to be primarily dependent on the "kind of protocol" and "sizing" of the NE. Such a situation can be reproduced or simulated off-line during application testing activities just deploying the OSS application and nodes and in a "DCN unconstrained scenario" based on a full dedicated LAN connectivity, to identify how the operation completion time is influenced by the node size.

"node size" is intended to refer to the configuration payload in terms of all the information resident on NEs (number of termination points, alarms, connections, performance, etc.) that are typically uploaded to the OSS to allow it to manage the NEs. The experimental results from preliminary OSS testing activities show that a node size SI can be represented as:

$$SI=\Sigma(Ni*Wi)$$

Where Ni is the information on NE to be loaded to the OSS, and Wi is the "information's weight", that is how much the exchange of this info between NE and NMS loads the DCN.

FIG. 9 shows such preliminary testing steps 300 and 302. At step 300 there is preliminary testing to determine for a given OSS operation (or range of operations) a formula F for a base completion time Tb, (assuming a reference situation of the DCN having zero latency, zero packet loss and unlimited bandwidth, though other less ideal reference situations could be used) with a defined dependency on factors Ni, Wi and protocol type (x).

Experimental results from such preliminary DCN testing activities can provide e.g. for a set of management operations, a formula F for "base time" (Tb) to complete that operation on an NE (e.g. to re-align the node configuration) mainly as a function of this sizing "SI" and of the protocol type that could be named as "protocol type factor" ("x").

$$\text{Base time}=Tb=f(x,SI) \text{ (This is typically not a linear function in "x" and "SI")}$$

From this, it is found that many typical operations by the OSS have a predictable time to complete, according to this base time (Tb) for an unconstrained DCN and the actual constrained capability of the DCN, which can be based on for example measured latency and measured packet loss, leading to this formula for completion time:

$$T=Tb+Tb*L*Lf+Tb*P*Pf$$

Where: T=Total completion time
L=measured DCN latency
Lf=Latency sensitivity factor
P=measured DCN packet loss in %
Pf=Pkt loss sensitivity factor
Tb=Base Time (depending on SI and protocol type)

Note that the proposed formula is provided here as an example and others can be conceived. Note the sensitivity factors for DCN latency and DCN packet loss can be derived for a given OSS operation by preliminary testing. Step 302 of FIG. 9 shows such as step of testing to determine for a given OSS operation (or range of operations) a factor Lf representing sensitivity of completion time to DCN latency, and a factor Pf representing sensitivity of completion time to DCN packet loss.

As shown in FIG. 9, there is a step 304 (corresponding to step 200 in FIG. 3 for example) of monitoring parameters (latency L, packet loss P) characteristic of actual DCN capability. The predictor component uses these values L and P (typically the average results of a set of previous measures (periodical or triggered)) in predicting at step 320 the OSS operation performance in terms of a predicted completion time Tex=Tb+Tb*L*Lf+Tb*P*Pf (this could be for example=40 seconds when Tb=15 seconds). This step also has as an input the reference performance information in the form of base time Tb calculated at step 314 using the formula F derived beforehand at step 300, and the sensitivity factors Lf and Pf predetermined at step 302. The predicted completion time Tex is compared to a measured actual completion time Tac which is obtained by monitoring at step 330. In one example Tac=50 seconds. The comparison is shown as step 340, comparing the predicted completion time Tex to a threshold such as the measured actual completion time Tac. This can be implemented by calculating a subtraction or a ratio for example. For the example completion times given, Tac-Tex=10 seconds. If this result is larger than a threshold, or alternatively if the ((T3−T4)/T3) ratio exceeds a threshold value (e.g. >0.5), a DCN degradation alarm will be raised. As shown at step 350 this alarm can be raised on the basis of the comparison and used for triggering a warning to the operator, and/or for adapting the OSS and/or adapting the DCN.

Figure 10:
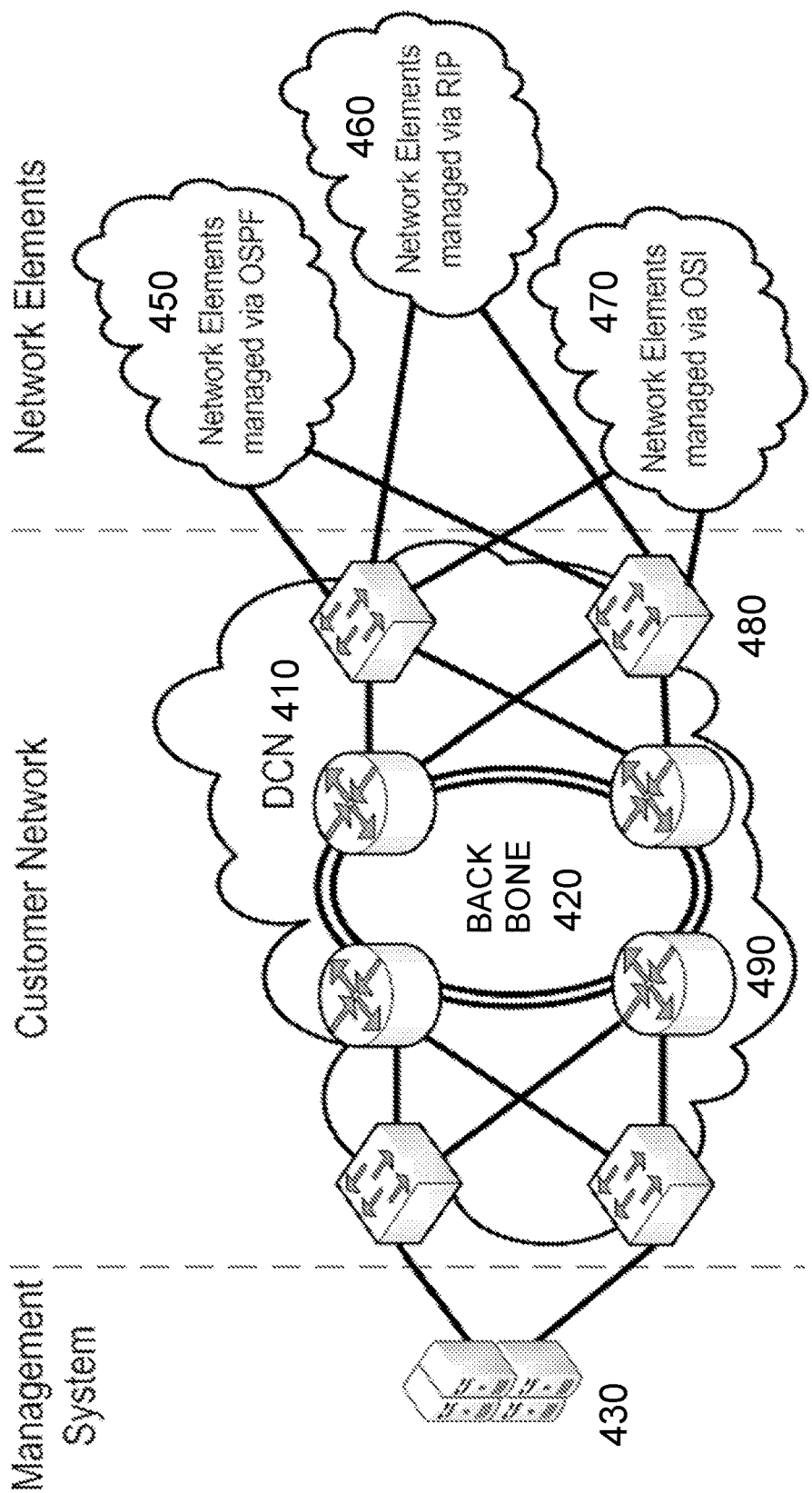
FIG. 10 shows a schematic view of an example of a DCN.

So, in summary, the following parameters are used by the predictor:

Lf, Pf=Are predetermined during DCN testing activities off-line or in lab for example.
Tb=Is predetermined from DCN testing activities off line or in lab
Tac=Is measured on live OSS and DCN
L,P=Measured on live DCN
Tex=Is calculated by formula Even if it is expected that the parameters (Base time, DCN Latency factor, DCN pkt loss factor) taken in account by this formula have a general application across different OSS operations, optionally each OSS application aiming to implement the predictor can have preliminary testing activities to identify:

A similar Tb modeling formula (SI and Protocol type dependency)
Sensitivity factors representing sensitivity of completion time to DCN latency and pkt loss FIG. 10, Schematic View of DCN FIG. 10 shows a schematic view of an example of a DCN 410 for connecting NEs 450, 460, 470, to a management system 430 hosting the OSS. The network elements form part of a core or backbone network, and the DCN makes use of a customer network or access network otherwise used for accessing the backbone network. The customer network has parts such as a DCN backbone ring 420, having nodes 490 for adding or dropping traffic onto the ring, and gateway nodes 480 at the edges of the customer network. The NEs each use different types of protocols for communication with the OSS, so NE 450 is managed via OSPF, NE 460 is managed via RIP, and NE 470 is managed via OSI.

Figure 11:
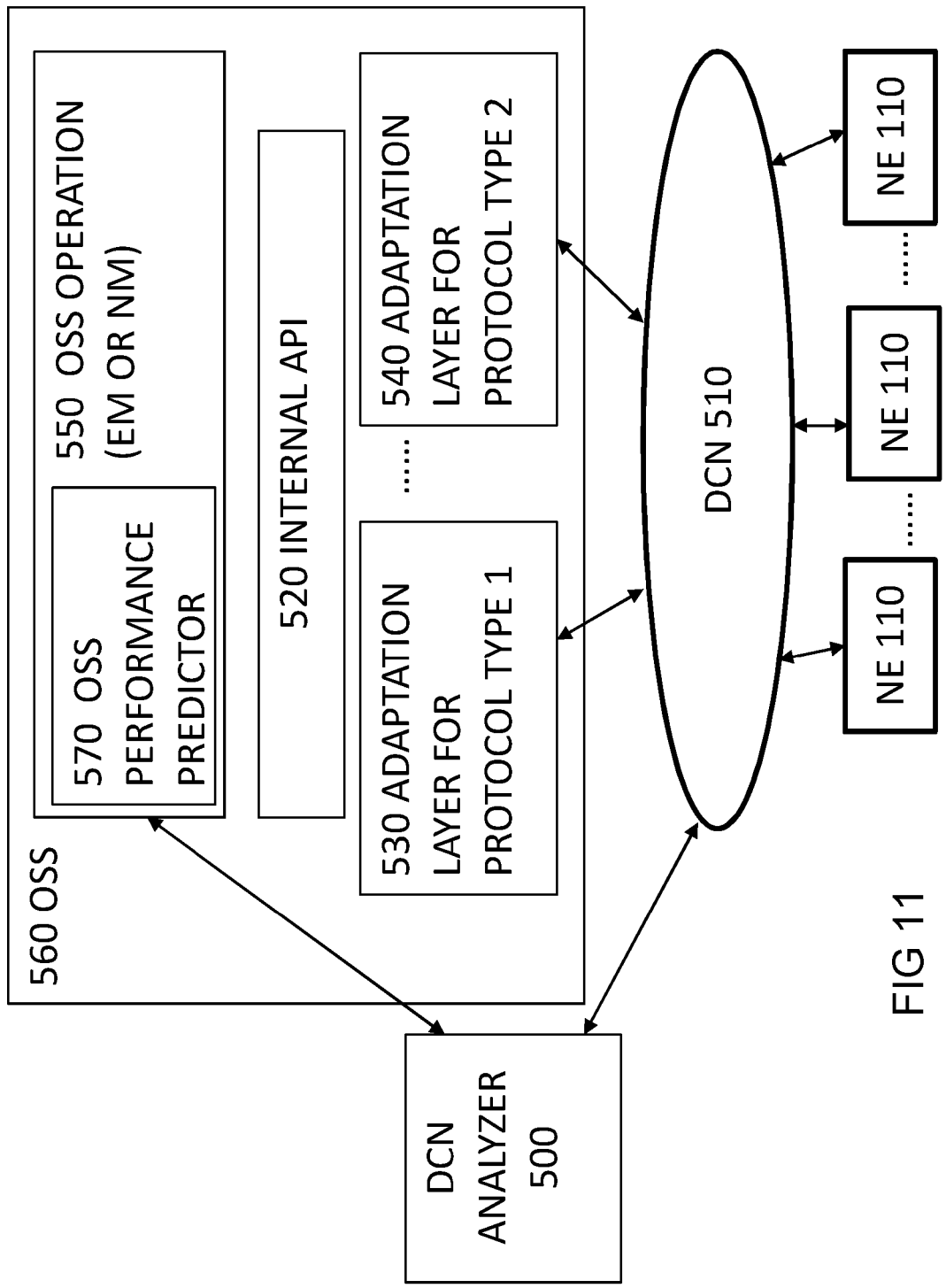
FIG. 11 shows a schematic view of OSS with predictor as an OSS application.

FIG. 11, Schematic View of OSS with Predictor as an OSS Application

FIG. 11 shows a schematic view of an OSS 560 having at least one OSS operation as an application, typically for an element management operation or for a network management operation, and incorporating its own OSS performance predictor. Alternatively the predictor can be external to the operation, or external to the OSS. The operation is in the form of an OSS application which communicates with the relevant NE or NEs through an internal API 520 to an adaptation layer 530 for protocol type 1, or an adaptation layer 540 for protocol type 2. These adaptation layers then pass the communications on to the relevant NE 110 across the DCN 510. This shows one way of arranging layers of software to handle different protocol types used for managing the different NEs, others are possible.

FIG. 12, Modular Example According to an Embodiment

FIG. 12 shows a schematic view of modules for various functions according to an embodiment. Apparatus 67 for managing the OSS 96 comprises a module 630 for monitoring a parameter characteristic of the actual DCN capability. A store 610 is provided for providing reference performance information for at least one operation of the OSS in respect of at least one NE. A module 620 is provided for predicting a performance of the given OSS operation based on the reference performance information and on the actual DCN capability. This is coupled to a module 630 for raising an alarm based on a comparison between the predicted performance and a defined threshold associated with the given OSS operation. The threshold is shown as originating at the OSS as it is associated with a given OSS operation, though it could be a stored threshold for example, or derived from measurements of OSS performance. The OSS is shown as having a number of operations 92, 94, including operation 1 and operation 2 and typically there would be many more. The DCN is shown as dotted lines coupling the OSS and the NEs 110. The NEs are shown as part of a telecommunications network being managed by the OSS. The modules can comprise for example hardware or software, processing circuits and associated memory, or other types of circuitry, and can be integrated to any amount, and boundaries between modules or how different functions are divided or combined into modules can be varied.

Accordingly this figure shows an example of apparatus for managing an operational support system (OSS) for a telecommunications network, the telecommunications network comprising network elements, the operational support system being coupled by a data communications network with those of the network elements managed by the operational support system. The apparatus comprises a module for monitoring at least one parameter characteristic of an actual capability of the data communications network, and a store for storing reference performance information for at least one operation of the operational support system in respect of at least one of the network element. There is also a module for predicting a performance of the operation of the operational support system based on the reference performance information for the operation and on the actual capability of the data communication network and a module for raising an alarm based on a comparison between the predicted performance and a defined threshold associated with the operation of the operational support system.

Any other features can be added to this, particularly any of the features of embodiments described above. One such feature is a module for determining the threshold based on a monitored actual performance of the operation of the operational support system. Another is a module for using the alarm for at least one of: triggering a warning to an operator, adapting an operation of the OSS, and adapting the DCN. Another such feature is the store being configured to provide the reference performance information dependent on a communication load needed for the operation in relation to the respective network element. Another is the store being configured to provide the reference performance information dependent on a protocol type used by the DCN for the respective network element. Another such feature is the module for predicting being adapted to predict the performance by selecting from at least two operations of the operational support system each relating to different network elements needing different communications loads, according to whichever of the different network elements corresponds more closely to a network element for which the actual performance is monitored, and the module for comparing being adapted to perform the comparison based on the predicted performance for the selected one of the operations of the operational support system.

Another such feature is the module for predicting being adapted to predict the performance of the operation based on the monitored actual capability of the data communication network adjusted by a predetermined factor representing a sensitivity of the predicted performance to the actual capability of the data communication network. Another such additional feature is the module for predicting being adapted to predict the performance of the operation as a predicted completion time of the operation, and to use a monitored actual completion time as the monitored actual performance for the operation. Another such feature is the module for predicting being adapted to make the comparison of the predicted performance and the defined threshold by determining if the monitored actual completion time is longer than the predicted completion time by a predetermined amount. Another such additional feature is the monitor being adapted to monitor a performance of the data communications network in terms of at least one of: a latency, a bandwidth and a packet loss characteristic.

CONCLUDING REMARKS

This predictor can be implemented as an additional component of a Network Element Manager, for example for optical components or any other NE. It can be operated in a periodic way and/or triggered by an OSS Operator, to:
i. Monitor the DCN network performances in terms of IP latency and Pkt loss percentage, and OSS application response time (e.g. focusing on a specific OSS operation set toward all or a sub-set of managed nodes)
ii. Compare the measured OSS application response time with the expected response time calculated through the model with given DCN latency/pkt loss percentage
iii. Raise an alarm on the OSS application alarm monitor in case the measured response time is relevantly higher (e.g. more than double) than the calculated value.

The embodiments described can enable predictions for possible faulty conditions based on DCN monitoring. By having the OSS raise an alarm when it is operating under DCN degraded conditions, action can be taken before the DCN degradation affects the OSS DCN intensive features. It can combine with or be integrated with OSS Element/Network Managers and optionally with a DCN Analyzer application. Some advantages of features described are:
   Providing an OSS application low performance detection mechanism
   Raising an alarm to the OSS Operator in case low OSS performances are related to DCN low performances
   Mitigating a risk of OSS operation failures when the DCN is overloaded or generally under-performing, providing in anticipation an alert (prediction) to the OSS Operator in order he can for example redesign/fix the DCN connectivity.
   Provide support for troubleshooting low OSS performance
   Reduce risk of continuous activation of OSS features without proper completion under a DCN overload conditions, causing even more DCN overloading and finally affecting the global operational capabilities of the OSS application itself (e.g. nodes link down status).

Other variations can be conceived within the claims.

The invention claimed is:

1. A method of managing an operational support system for a telecommunications network, the telecommunications network comprising network elements, the operational support system being coupled by a data communications network with those of the network elements managed by the operational support system, the method comprising:
   monitoring at least one parameter characteristic of an actual capability of the data communications network;
   providing reference performance information for at least one operation of the operational support system in respect to at least one of the network elements;
   predicting performance of the at least one operation of the operational support system based on the reference performance information for the at least one operation and on the actual capability of the data communications network; and
   raising an alarm based on a comparison between the predicted performance and a defined threshold associated with the at least one operation of the operational support system.

2. The method of claim 1, further comprising determining the threshold based on a monitored actual performance of the at least one operation of the operational support system.

3. The method of claim 1, further comprising thereafter using the alarm as an input to at least one of:
   triggering a warning to an operator;
   adapting an operation of the operational support system; and
   adapting the data communications network.

4. The method of claim 1, wherein the reference performance information is dependent on a communication load needed for the at least one operation in relation to the respective network element.

5. The method of claim 1, wherein the reference performance information is dependent on a protocol type used by the data communications network for the respective network element.

6. The method of claim 1, wherein predicting the performance of the at least one operation is based on monitored actual capability of the data communications network adjusted by a predetermined factor representing a sensitivity of the predicted performance to the actual capability of the data communications network.

7. The method of claim 2, wherein:
   predicting the performance of the at least one operation comprises predicting a completion time of the at least one operation, and
   the monitored actual performance comprises a monitored actual completion time for the at least one operation.

8. A non-transitory computer readable recording medium storing a computer program product for managing an operational support system for a telecommunications network, the telecommunications network comprising network elements, the operational support system being coupled by a data communications network with those of the network elements managed by the operational support system, the computer program product comprising software instructions which, when run on processing circuitry of a computing device, cause the computing device to:
- monitor at least one parameter characteristic of an actual capability of the data communications network;
- provide reference performance information for at least one operation of the operational support system in respect to at least one of the network elements;
- predict performance of the at least one operation of the operational support system based on the reference performance information for the at least one operation and on the actual capability of the data communications network; and
- raise an alarm based on a comparison between the predicted performance and a defined threshold associated with the at least one operation of the operational support system.

9. An apparatus for managing an operational support system for a telecommunications network, the telecommunications network comprising network elements, the operational support system being coupled by a data communications network with those of the network elements managed by the operational support system, the apparatus comprising:
- a first memory portion configured to store reference performance information for at least one operation of the operational support system in respect of at least one of the network elements;
- processing circuitry; and
- a second memory portion containing instructions executable by the processing circuitry whereby the apparatus is operative to:
  - monitor at least one parameter characteristic of an actual capability of the data communications network;
  - predict a performance of the at least one operation of the operational support system based on the reference performance information for the at least one operation and on the actual capability of the data communications network; and
  - raise an alarm based on a comparison between the predicted performance and a defined threshold associated with the at least one operation of the operational support system.

10. The apparatus of claim 9, wherein the instructions are such that the apparatus is further operative to determine the threshold based on a monitored actual performance of the at least one operation of the operational support system.

11. The apparatus of claim 9, wherein the instructions are such that the apparatus is further operative to use the alarm for at least one of:
- triggering a warning to an operator;
- adapting an operation of the operational support system; and
- adapting the data communications network.

12. The apparatus of claim 9, wherein the first memory portion is further configured to provide the reference performance information dependent on a communication load needed for the at least one operation in relation to the respective network element.

13. The apparatus of claim 9, wherein the first memory portion is further configured to provide the reference performance information dependent on a protocol type used by the data communications network for the respective network element.

14. The apparatus of claim 10, wherein the instructions are such that the apparatus is operative to:
- predict the performance by selecting from at least two operations of the operational support system each relating to different network elements needing different communication loads, according to whichever of the different network elements corresponds more closely to a network element for which the actual performance is monitored; and
- perform the comparison based on the predicted performance for the selected one of the at least two operations of the operational support system.

15. The apparatus of claim 9, wherein the instructions are such that the apparatus is operative to predict the performance of the at least one operation based on monitored actual capability of the data communications network adjusted by a predetermined factor representing a sensitivity of the predicted performance to the actual capability of the data communications network.

16. The apparatus of claim 10, wherein the instructions are such that the apparatus is operative to predict the performance as a predicted completion time of the at least one operation, and to use an actual completion time as the monitored actual performance for the at least one operation.

17. The apparatus of claim 16, wherein the instructions are such that the apparatus is further operative to make the comparison between the predicted performance and the defined threshold by determining if the actual completion time is longer than the predicted completion time by a predetermined amount.

18. The apparatus of claim 9, wherein the instructions are such that the apparatus is operative to monitor the at least one parameter characteristic of the actual capability of the data communications network in terms of at least one of: a latency, a bandwidth, and a packet loss characteristic.

19. An operational support system for a telecommunications network, the telecommunications network comprising network elements, the operational support system being coupled by a data communications network with those of the network elements managed by the operational support system, the operational support system comprising:
- an apparatus for managing the operational support system, the apparatus comprising:
  - a first memory portion configured to store reference performance information for at least one operation of the operational support system in respect of at least one of the network elements;
  - processing circuitry; and
  - a second memory portion containing instructions executable by the processing circuitry whereby the apparatus is operative to:
    - monitor at least one parameter characteristic of an actual capability of the data communications network;
    - predict a performance of the at least one operation of the operational support system based on the reference performance information for the at least one operation and on the actual capability of the data communications network; and
    - raise an alarm based on a comparison between the predicted performance and a defined threshold associated with the at least one operation of the operational support system.

* * * * *